(12) United States Patent
Kaiser (10) Patent No.: US 6,912,482 B2
(45) Date of Patent: Jun. 28, 2005

(54) DATA STORAGE ANALYSIS MECHANISM

(75) Inventor: Scott Douglas Kaiser, Burlingame, CA (US)

(73) Assignee: Veritas Operating Corporation, Mountain View, CA (US)

( * ) Notice: Subject to any disclaimer, the term of this patent is extended or adjusted under 35 U.S.C. 154(b) by 0 days.

(21) Appl. No.: 10/659,891

(22) Filed: Sep. 11, 2003

(65) Prior Publication Data

US 2005/0060125 A1 Mar. 17, 2005

(51) Int. Cl.⁷ .............................................. G06F 17/60
(52) U.S. Cl. ...................... 702/186; 702/183; 702/187; 702/179; 711/170; 714/5
(58) Field of Search ................... 702/181, 180, 702/186, 179, 182, 183, 185, 187, 188, 129; 711/170–172, 159, 160, 133–136, 114, 156, 173, 100; 714/5–7, 13, 37, 47, 42, 1; 707/9, 200, 10, 202, 204, 205; 709/224, 225, 223, 226, 213–215; 705/38, 22, 28, 29, 7–10, 1; 710/1, 5, 15, 17–19; 718/104, 105; 703/2, 21

(56) References Cited

U.S. PATENT DOCUMENTS

| | | | |
|---|---|---|---|
| 6,269,410 B1 | 7/2001 | Spasojevic ...................... | 710/5 |
| 6,606,585 B1 | 8/2003 | Golding et al. ................. | 703/2 |
| 6,636,905 B1 | 10/2003 | McNamer et al. ............. | 710/15 |
| 6,751,718 B1 * | 6/2004 | Manin ......................... | 711/170 |
| 6,839,822 B2 * | 1/2005 | Knippel et al. .............. | 711/170 |
| 2003/0014604 A1 * | 1/2003 | Nishio et al. ................ | 711/159 |
| 2003/0023713 A1 | 1/2003 | Slater et al. ................. | 709/223 |
| 2003/0061546 A1 | 3/2003 | Collins et al. ................ | 714/42 |
| 2003/0135385 A1 * | 7/2003 | Karpoff ......................... | 705/1 |
| 2003/0145186 A1 | 7/2003 | Szendy et al. .............. | 711/173 |
| 2004/0015908 A1 | 1/2004 | Giel et al. ................... | 717/141 |
| 2004/0024921 A1 | 2/2004 | Peak, Jr. et al. ............. | 710/1 |
| 2004/0025162 A1 | 2/2004 | Fisk .......................... | 718/105 |
| 2004/0054618 A1 * | 3/2004 | Chang et al. ................. | 705/38 |
| 2004/0068455 A1 * | 4/2004 | Jacobus et al. .............. | 705/36 |
| 2004/0073677 A1 * | 4/2004 | Honma et al. .............. | 709/226 |
| 2004/0153481 A1 * | 8/2004 | Talluri ........................ | 707/200 |
| 2004/0225659 A1 * | 11/2004 | O'Brien et al. ................ | 707/9 |
| 2004/0243699 A1 * | 12/2004 | Koclanes et al. ........... | 709/224 |

OTHER PUBLICATIONS

U.S. Appl. No. 60/411,418.*

* cited by examiner

Primary Examiner—Hal Wachsman
(74) Attorney, Agent, or Firm—Robert C. Kowert; Meyertons, Hood, Kivlin, Kowert, Goetzel, P.C.

(57) ABSTRACT

System and method for data storage management. Embodiments may be used to perform analysis of disk-based data storage. Embodiments may provide a storage analysis mechanism for estimating storage inventory/availability risk tradeoff for data storage media for an application or group of applications. Embodiments may be used to generate storage inventory information and recommendations or requirements for pooled and/or non-pooled storage. Embodiments may be used to compare pooled storage to non-pooled storage for a plurality of applications in a storage system.

38 Claims, 5 Drawing Sheets

DATA STORAGE ANALYSIS MECHANISM

BACKGROUND OF THE INVENTION

1. Field of the Invention

This invention is related to the field of computer systems and, more particularly, to data storage systems.

2. Description of the Related Art

Data storage can be expensive. In managing data storage, questions to be asked may include: How much storage does an enterprise need? Does the enterprise have too much storage, or not enough storage? A bias held by many system administrators is to have an excess of storage (more than is really needed) because they typically are not penalized for having too much capital equipment, but may be penalized for running out of storage if, for example, an application has to shut down. So typically, an enterprise may buy more storage than is needed and allocate the storage before it is actually needed to specific applications. This tends to create waste as funds that could be better spent elsewhere in the corporation are unnecessarily tied up in hardware. Reasons for this tendency to acquire too much storage may include that, in the open systems market, it has historically been difficult to add storage quickly. Storage Area Network (SAN) architecture may help with the problem by reducing the amount of time needed between the time that it is determined that more storage is needed and when the new storage is up and available to an application.

In storage systems, utilization is a metric that may be used to decide when an individual file system needs to be resized, but it is not a sufficient metric for understanding storage usage. Utilization, the percentage of storage used in a file system, may have limitations including, but not limited to, the following.

First, utilization typically fails to account for free space available to applications but unavailable to the file system. Commercial databases typically pre-allocate large data files but only use a relatively small portion of the files. Without knowing the rate at which the database consumes these files or the amount of free space available to the database, administrators may have a difficult time measuring storage demand.

Second, as more data is kept, utilization increases. Organizations that keep large amounts of historic data tend to have higher utilization. This does not necessarily imply better inventory management. On a related note, rewarding high utilization may create a disincentive to purge useless data.

The important aspect of storage to be examined, then, is not utilization (how full is the storage? How much are you using at a given time?), but how much storage is being used in relation to the incoming demand. Utilization is not the right metric for analyzing storage levels. Therefore, it is desirable to provide a system and method for applying storage management techniques that deal with demand in storage systems. It is also desirable for these storage management techniques that match storage demand with supply, and to preferably attempt to balance the cost of carrying storage inventory with the cost of running out of storage.

SUMMARY

Embodiments of a system and method for data storage management are described. Embodiments may be used to perform analysis of storage using storage management techniques for disk-based data storage. One embodiment may provide a storage analysis mechanism for estimating storage inventory/risk (stockout) tradeoff for data storage media for an application or group of applications. Embodiments may be used to generate storage inventory information and recommendations or requirements for pooled and non-pooled storage. Embodiments may also be applied to the analysis and estimation of usage for other components of storage systems than just raw terabytes of disk storage, e.g. servers or hosts, switches, routers, ports, etc, or even other non-storage computing resources. Embodiments may also be applied to the analysis and estimation of usage for tape cartridges for tape-based storage, CDs, DVDs, or other media for optically-based storage, or other types of storage.

In one embodiment, storage demand data for a storage system may be collected. This storage demand data may be automatically collected, user-entered, or a combination of automatically collected and user-entered data. At least some of the storage demand data may be collected over a given time period. In one embodiment, a periodic review time may be specified. The periodic review time indicates the time between periodic reviews of storage consumption, or essentially the time between adding storage to the storage system. In one embodiment, a lead time to acquire new storage may be determined or estimated. A storage requirement (i.e., the required available storage for the storage system at some future time) for the storage system to meet a given storage availability risk level under one or more conditions indicated by the storage demand data, along with other factors such as lead time and periodic review time, may be determined. In one embodiment, the one or more conditions indicated by the storage demand data may include demand, which indicates the amount of storage consumed by one or more applications in a given time period. In one embodiment, the one or more conditions indicated by the storage demand data may include demand variability, a measurement of the amount of variability in storage consumption by the one or more applications in the given time period. In one embodiment, the one or more conditions indicated by the storage demand data may include rate of change in demand, a measurement of trend in demand. In one embodiment, the storage requirement may indicate a target storage inventory-on-hand and/or a target storage average inventory-on-hand.

One embodiment may be used to determine tradeoffs between storage factors including, but not limited to, available storage, storage availability risk (risk of running low or out of available storage), and demand in storage systems. In this embodiment, different values for factors such as risk, available storage, and demand may be modified using the storage analysis mechanism to estimate or determine how those modified values affect the other storage factors. In one embodiment, the storage management system may be used to determine a storage availability risk level for the storage system given a storage requirement for the storage system under the one or more conditions indicated by the storage demand data and one or more other factors (e.g. lead time and periodic review time). In one embodiment, the storage management system may be used to determine a storage demand capacity given a storage availability risk level and a storage requirement for the storage system.

One embodiment may be used for comparing pooled storage to non-pooled storage in a system with two or more applications, and may enable the user to determine if pooling storage is preferable for the system. The storage requirement for a plurality of applications configured in a non-pooled storage system to meet a storage availability risk level under one or more conditions indicated by storage demand data for the applications may be determined. The storage requirement for the plurality of applications configured to use a pooled storage system to meet the storage availability risk level under the conditions indicated by the storage demand data may also be determined. The non-pooled storage requirement and the pooled storage requirement may be compared to determine if the pooled storage system or the non-pooled storage system is to be used for the plurality of applications. Note that, in many situations, pooling storage may preferably result in a lower storage requirement, as the risk for the applications may be spread out over the pooled storage.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for data storage management are described. Embodiments may be used to perform analysis of storage using storage management techniques for storage systems (e.g. disk-based data storage). One embodiment may provide a storage analysis mechanism for estimating storage inventory/stockout risk tradeoff for data storage media for an application or group of applications. Embodiments of the storage analysis mechanism may, for example, be used generate inventory reports and/or recommendations for data storage systems, including pooled storage (e.g. pooled storage in a Storage Area Network (SAN), Network Attached Storage (NAS), etc.) and non-pooled storage (e.g. non-pooled storage in a Direct Attach Storage (DAS) and segmented storage networks). In some embodiments, units of storage may be treated as inventory, and inventory planning concepts and algorithms of an Inventory Analysis model may be used to generate inventory reports and recommendations for data storage systems. Exemplary Inventory Analysis models that may be used are described, but note that other Inventory Analysis models than those described may be used.

Embodiments may be implemented in SAN environments, NAS environments, or other types of network storage environments. One embodiment may be integrated in or used with SAN management systems (e.g., VERITAS SANPOINT CONTROL). Embodiments may also be implemented in non-networked storage environments, even in a single-machine system.

While embodiments are generally described herein in regards to disk-based storage, note that some embodiments may also be used to perform inventory analysis for backup media or other types of storage. Embodiments may also be applied to the analysis and estimation of usage for other components of storage systems than just raw terabytes of storage, e.g. servers or hosts, switches, routers, ports, etc, or even other computing resources. Embodiments may also be applied to the analysis and estimation of usage for tape cartridges for tape-based storage, CDs, DVDs, or other media for optically-based storage, or other types of storage. One embodiment may be used to estimate server provisioning or other computing resources, for example in a clustered file server environment or in a clustered database. In general, embodiments may be used in estimating how many servers or other resources are required in an environment regardless of whether the workload is shared or independent.

Using embodiments, to measure storage efficiency for an application, group of applications, department, division, or other unit, organizations may monitor storage inventory relative to demand. Storage inventory preferably accounts for most or all available storage, whether unused space in database files, file system free space, unused space on logical volumes, or unassigned disks. Note that storage may be deliberately unused to improve latency and/or throughput, sometimes referred to as "shortstroking." This preferably does not count as unused storage since the storage is fully utilized from a performance, if not a capacity, standpoint. Note that, in some applications, unused but allocated space (e.g. unused space in a database file) may be considered unavailable from a file system perspective, but to be accurate in estimating storage inventory, the unused space for such applications may be counted in the storage inventory as available storage space in one embodiment.

In one embodiment, for each application, group of applications, and/or for other units (e.g. departments and divisions of an enterprise), storage demand and standard deviation of demand (i.e. demand variability) of a storage system may be monitored, storage availability risk level for the storage system may be estimated or determined, lead time to acquire new storage may be estimated or determined, and a periodic review time may be estimated or determined. Periodic review time may be the time between checks (periodic reviews) to see if more storage is needed, and may be considered the time between adding new storage to the storage system. This information, and possibly other information, may be analyzed using the storage analysis mechanism to determine an amount of available storage needed to meet demand for storage at a given level of storage availability risk.

In one embodiment, lead time may be estimated. For example, a system may track the time between the decision or initiation of a process to acquire new storage and the time the new storage actually becomes usable, and then this historical data may be used to estimate the lead time as input to the process.

In one embodiment, storage demand data may be collected from the storage system and used to determine one or more conditions indicated by the storage demand data, e.g. storage demand and storage demand variability. In one embodiment, the storage analysis mechanism may automatically collect the storage demand data. In one embodiment, another application (e.g. a storage monitoring application) may collect the storage demand data and provide it to the storage analysis mechanism. In one embodiment, a user may collect storage demand data and provide it to the storage analysis mechanism, or alternatively may determine one or more conditions from the storage demand data (e.g. storage demand and storage demand variability) and provide the determined conditions to the storage analysis mechanism.

One embodiment may be used to determine tradeoffs between increasing or decreasing available storage and increasing or decreasing storage availability risk in a storage system. For example, an embodiment may allow a storage system administrator to see the increase in risk if available storage is decreased by a certain amount. In addition, one embodiment may be used to determine a storage availability risk level at a given level of demand and with a given amount of available storage, and/or to determine an acceptable demand level or capacity at a given level of storage availability risk with a given amount of available storage. Thus, embodiments may be used by enterprises to determine tradeoffs between levels of risk, available storage, and/or demand in storage systems. In these embodiments, different values for risk, available storage, and/or demand may be input to the storage analysis mechanism to estimate or determine how those values affect the other factors. In one embodiment, available storage may refer to an average available storage over a period of time. In some embodiments, in addition to risk, available storage, and demand, other storage factors may be included and modified, if desired, in determining tradeoffs among the storage factors.

Embodiments may be used to perform storage analysis and/or generate storage recommendations for particular applications, departments, or other units of an enterprise. Alternatively, embodiments may be used to perform storage analysis and/or generate storage recommendations for combined (pooled) storage of two or more units (applications, departments, divisions, etc.) of an organization. Performing the storage analysis for combined units (pooled storage) may preferably allow the storage analysis mechanism to generate a lower overall storage requirement for the enterprise than evaluating the different units separately (non-pooled storage).

In one embodiment, storage availability risk levels may be compared across two or more systems within an enterprise. This may help the enterprise to identify relative disparities among various applications. This may also make it easier to understand and adjust risk levels for enterprises that are unfamiliar with the concepts and practices of inventory planning for storage systems. For example, it may be easier for an enterprise to take action on output such as this rather than just looking at the risk for a single application in a vacuum:

| Application | Storage availability risk |
|---|---|
| A | .01 |
| B | .004 |

-continued

| Application | Storage availability risk |
|---|---|
| C | .003 |
| D | .000002 |

Storage information that may be acquired or determined and used in storage analysis by the storage analysis mechanism may include one or more of, but is not limited to, demand, demand variability, rate of change in demand, stockout tolerance (storage availability risk), periodic review time, and lead time. In one embodiment, rate of change of demand over a period may be determined. In one embodiment, to perform storage analysis, the storage analysis mechanism may need to know or determine the storage demand or an estimation of the demand, demand variability or an estimation of demand variability, a number or estimate of the storage availability risk, and the lead time (how long it takes to get storage from the time it is decided more is needed to the time it is available for use by applications) or a lead time estimate. Note that if the lead time is long, more storage may need to be made available; if the lead time is short, then less storage may need to be made available.

In the context of storage, inventory-on-hand is storage that an application or applications can use. Average inventory-on-hand is the mean inventory-on-hand over a given period. Basestock is the target storage inventory-on-hand that it is planned to have after replenishing storage. In an order-up-to inventory model and in at least some other inventory models, generating either a target basestock or a target average inventory-on-hand may be used to determine or estimate the other. Basestock may be referred to herein as available storage, and target average inventory-on-hand may be referred to as target average available storage.

Embodiments may provide an application-centric view of storage systems in regards to inventory-on-hand. Commercial databases typically pre-allocate large data files, then use that storage over time. From a file system perspective, that storage is not available, but a survey of inventory-on-hand preferably includes unused storage within database files. In one embodiment, inventory-on-hand may also preferably include free space in the file system and unused volumes and Logical Units (LUNs).

In one embodiment, a process of managing storage inventory may include directly monitoring and collecting data from the storage system and/or collecting (inputting or accessing) data from other sources (e.g. user input or data collected into a database by a storage monitoring application). This data may include, but is not limited to, data related to storage allocation and consumption in the storage system. In one embodiment, the storage information may be collected and analyzed to determine or estimate one or more storage demand metrics or conditions. These storage demand conditions may include, but are not limited to, storage demand (how much data storage has been historically consumed in terms of demand), and the variability of that demand over a period (demand variability). Storage demand and variability of demand may be determined or estimated for every application that is consuming storage, or at other levels such as at every host or department that is consuming storage.

In one embodiment, storage demand may be adjusted in light of factors such as if it is known that storage is going to be freed and returned to the storage inventory or if it is known that demand is going to increase. Necessary or desired adjustments to the collected data and/or storage metrics may be made. From this collection and analysis of the storage data, and in addition the input of one or more other potentially variable factors such as storage availability risk, lead time, and periodic review time, a plan or recommendation for how much available storage may be needed (which may be referred to as a storage requirement) may be generated. A storage requirement may include, but is not limited to, available storage (the target storage inventory-on-hand that it is planned to have after replenishing storage) and/or a target average available storage. In addition, one or more reports on storage usage may be generated. In addition, one embodiment may be used to determine tradeoffs between levels of risk, available storage, and/or demand in storage systems. In this embodiment, values for one or more storage factors including, but not limited to, risk, available storage, and demand may be adjusted to estimate or determine how adjusting the one or more storage factors affect the values of the other storage factors.

Figure 1:
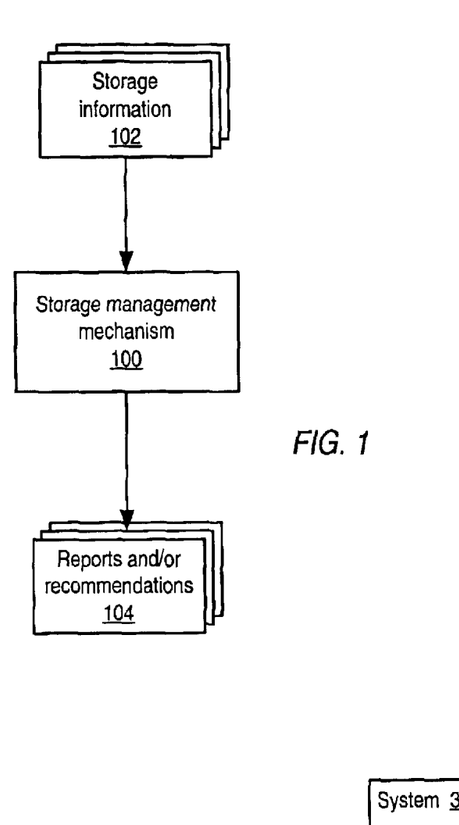
FIG. 1 illustrates data flow of a storage analysis mechanism according to one embodiment.
Figure 2:
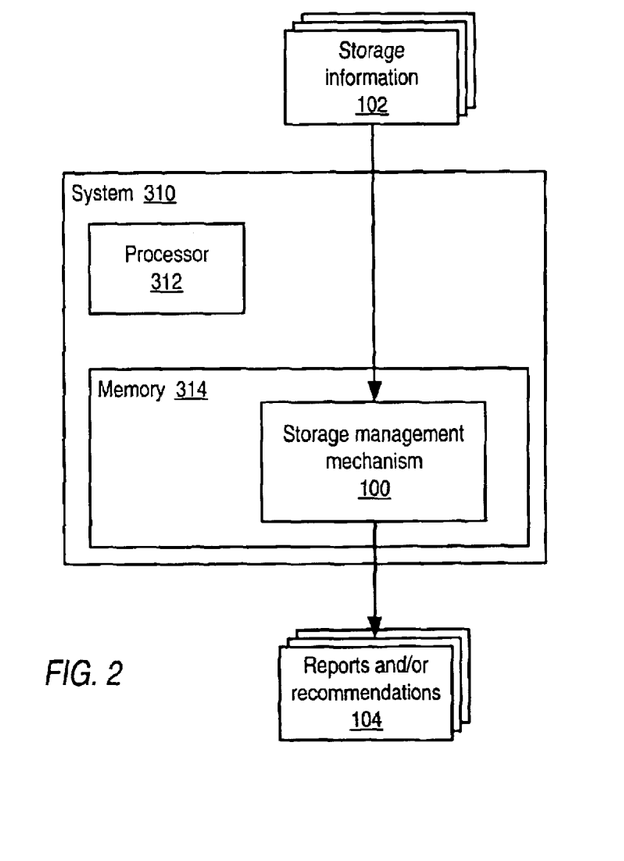
FIG. 2 illustrates a system implementing a storage analysis mechanism according to one embodiment.

FIGS. 1 and 2 illustrate means for collecting storage demand data for a storage system, means for determining one or more conditions for the storage system from the storage demand data, and means for determining a storage requirement for the storage system to meet a given storage availability risk level under the one or more conditions indicated by the storage demand data.

In one embodiment, the process of managing storage inventory may be implemented in a storage analysis mechanism. FIG. 1 illustrates data flow of a storage analysis mechanism implementing the process described above according to one embodiment. Storage information 102 may be input to and/or collected by storage analysis mechanism 100. Storage information 102 may include, but is not limited to, available storage allocation and/or consumption information, e.g. how much available storage is being consumed by one or more applications in the storage system. In one embodiment, at least some of storage information 102 may be collected directly from the storage system by storage analysis mechanism 100. In one embodiment, at least some of storage information 102 may be collected or determined externally by a user or another application, e.g. by a storage administrator or a storage monitoring application, and provided to storage analysis mechanism 100 as input, either directly or through storage analysis mechanism 100 accessing a database of storage information compiled by the user or storage monitoring application. In one embodiment, for SAN systems, storage information 102 may be collected by a SAN management system of the SAN system and provided as input (either directly or through a database) to storage analysis mechanism 100.

The storage information 102 may be analyzed to generate one or more storage demand metrics or conditions such as demand, demand variability, and/or rate of change of demand over a period. Alternatively, one or more of these conditions may be determined externally to storage analysis mechanism, e.g. by a storage administrator or a storage monitoring application, and provided to storage analysis mechanism 100 as input. The storage demand conditions may be used, along with one or more other factors (e.g. storage availability risk, lead time, and periodic review time) that may be determined by or input into storage analysis mechanism 100, to generate storage reports and/or recommendations 104, and/or to determine tradeoffs between storage factors including, but not limited to, available storage, risk, and demand.

In one embodiment, storage information 102 may be analyzed by storage analysis mechanism 100 to generate an estimation of storage inventory levels, for example for use in financial analysis and/or benchmarking inventory levels against other departments, enterprises, corporations, agencies, etc.

In one embodiment, storage analysis mechanism 100 may be implemented as a utility or application that automatically monitors storage usage and applies storage analysis techniques (in one embodiment, techniques according to an Inventory Analysis model) to generate and make recommendations or determine tradeoffs between storage factors including, but not limited to, available storage, risk, and demand. In this embodiment, the storage analysis mechanism 100 may monitor storage systems to gather storage information 102. From the storage information, storage analysis mechanism 100 may generate metrics including one or more of, but not limited to; how much storage is being carried, storage demand, and storage demand variance. One or more other, potentially variable, factors such as storage availability risk, lead time, and periodic review time, may be determined by or input into storage analysis mechanism 100. Using the storage information, generated metrics, and the one or more other factors, storage analysis mechanism 100 may generate inventory management performance and/or recommendation output 104, and/or to determine tradeoffs among storage factors including, but not limited to, available storage, risk, and demand.

In another embodiment, the storage analysis mechanism 100 may be implemented as a utility or application that guides the storage administrator through a process of entering information 102 about their storage system, storage usage history and expectations and generates reports and/or recommendations 104 based on the user input, and/or to determine tradeoffs among storage factors including, but not limited to, available storage, risk, and demand. In this embodiment, the storage analysis mechanism 100 may be a workflow-based application that walks the storage administrator through the process, and that helps the storage administrator make storage acquisition and allocation decisions and to determine tradeoffs. In one embodiment, this workflow-based application may automatically collect at least some of the necessary storage information 102. These embodiments may be similar in their underlying implementation, data-gathering, and inventory analysis capabilities but may provide different user interfaces.

Some embodiments may combine automatic data gathering with user input. Some embodiments may permit the user to either allow storage analysis mechanism 100 to automatically gather the storage information 102 or to override at least some of the storage information 102 automatically gathered if desired. In general, embodiments may report on storage usage, make recommendations based on the input storage information 102, and/or determine tradeoffs among storage factors including, but not limited to, available storage, risk, and demand whether storage information 102 is automatically gathered, user-entered, and/or provided to storage analysis mechanism 100 by another application.

Using embodiments of storage analysis mechanism 100, the process of obtaining storage information 102, generating storage demand metrics or conditions from the obtained storage information 102, and using the storage demand metrics or conditions and in some embodiments one or more other factors to generate reports and/or recommendations 104, and/or to determine tradeoffs among storage factors including, but not limited to, available storage, risk, and demand may be performed for storage at the individual application or database level, for groups of applications, and/or for entire departments, divisions, or other units of an enterprise. The process may be performed for pooled or non-pooled storage.

In one embodiment, storage analysis mechanism 100 may be used to analyze storage for two or more applications to compare and contrast pooled storage vs. non-pooled storage for the applications. In other words, the process may be performed for the applications collectively using pooled storage, and also performed individually for the applications using non-pooled storage. Note that the entire process may not need to be performed twice; for example, obtaining storage information 102 may be performed once, and the obtained storage information 102 may be used in the performances of the process. One or more factors may be modified to fit the particular storage model (pooled or non-pooled) being analyzed. The results of the two analyses may be compared to determine which storage model may be best suited for the two or more applications in regards to one or more storage factors including, but not limited to, risk, available storage requirements, and demand.

FIG. 2 illustrates a system implementing a storage analysis mechanism according to one embodiment. System 310 may be any of various types of devices, including, but not limited to, a personal computer system, desktop computer, laptop or notebook computer, mainframe computer system, workstation, network computer, or other suitable device. System 310 may include at least one processor 312. The processor 312 may be coupled to a memory 314. Memory 314 is representative of various types of possible memory media, also referred to as "computer readable media." Hard disk storage, floppy disk storage, removable disk storage, flash memory and random access memory (RAM) are examples of memory media. The terms "memory" and "memory medium" may include, but is not limited to: an installation medium, e.g., a CD-ROM or floppy disk, a DVD, and/or a tape unit, a computer system memory such as DRAM, SRAM, EDO RAM, SDRAM, DDR SDRAM, Rambus RAM, etc., or a non-volatile memory such as a magnetic media, e.g., a hard drive, tape drive, or optical storage such as a CD or DVD. The memory medium may include other types of memory as well, or combinations thereof. System 310 may couple over a network to one or more other devices via one or more wired or wireless network interfaces (not shown), such as a storage system being analyzed and/or a system running a storage monitoring application.

System 310 may include, in memory 314, a storage analysis mechanism 100 that may receive storage information 102 (e.g. storage demand data) as input and generate one or more reports and/or recommendations 104 as output. In one embodiment, storage analysis mechanism 100 may collect storage information 102 from one or more sources. In one embodiment, storage information 102 may be automatically collected from the storage system. In one embodiment, storage information 102 may be entered by a user (e.g. a system administrator) through a user interface to storage analysis mechanism 100. Other embodiments may receive some storage information 102 through user input and automatically collect other storage information 102 from the storage system. Storage analysis mechanism 100 may then apply the storage information 102 to one or more inventory algorithms to generate storage recommendations and/or may generate one or more storage usage reports. In one embodiment, storage analysis mechanism 100 may be used to analyze tradeoffs among storage factors including, but not limited to, storage availability, risk, and demand. In one embodiment, storage analysis mechanism 100 may be used to compare a pooled storage configuration to a non-pooled storage configuration for a plurality of applications, department, divisions, etc., to determine if pooled or non-pooled storage is preferable for an enterprise.

System 310 may also include one or more display devices (not shown) for displaying output of storage analysis mechanism 100 and/or one or more user input devices (e.g. keyboard, mouse, etc.; not shown) for accepting user input to storage analysis mechanism 100.

Figure 3:
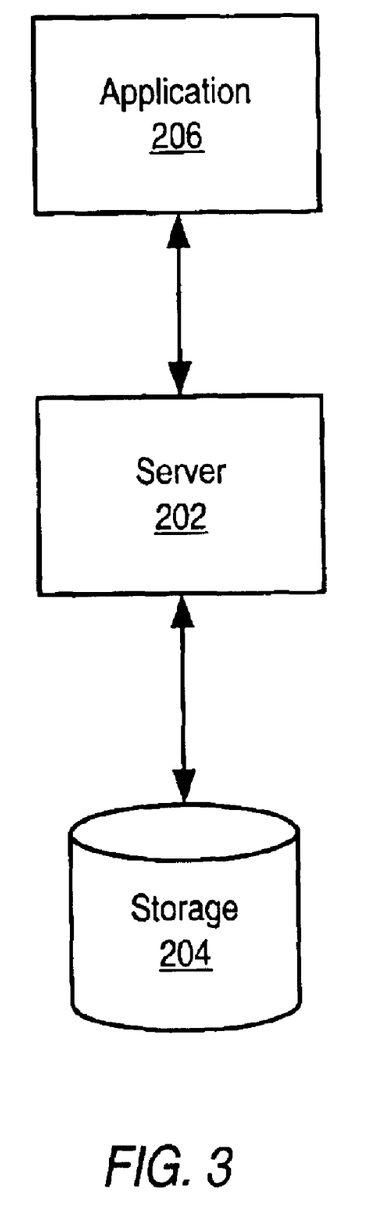
FIG. 3 illustrates a non-pooled storage environment according to one embodiment.

FIG. 3 illustrates a non-pooled storage environment according to one embodiment. In this embodiment, a server 202 is coupled (directly attached or network-attached) to storage 204. Server 202 provides access to storage 204 for application 206. Note that application 206 may reside on the same computer system or "box" as server 202 or alternatively on another box. Note that storage in a Storage Area Network (SAN) or Network Attached Storage (NAS) may be non-pooled (allocated for use by a single application). Alternatively, rather than having server 202 as an intermediary, application 206 may directly access storage 204. In the non-pooled storage environment, application 206 does not share storage 204 with other applications. In one embodiment, a storage analysis mechanism (not shown) may reside on server 204, or alternatively on another system coupled to server 204 and storage 204. In this embodiment, the storage analysis mechanism may automatically collect at least some storage information from the storage system, perform inventory analysis on the collected storage information, and generate storage reports and recommendations. In another embodiment, storage analysis mechanism may reside on a system not coupled to server 204 and/or storage 204. In this embodiment, a user may enter storage information into the storage analysis mechanism, which may then perform inventory analysis on the collected storage information, and generate storage reports and recommendations.

Note that, in some computing environment, "server" may be synonymous with "computer", "system", "computer system", and/or "client", and thus embodiments as depicted in FIG. 3 and in the other Figures are to be considered applicable to computer systems in general without regards to labels such as "server", "client", etc. Thus, in FIG. 3, server 202 may be a server, a client, or in general any computer system.

Figure 4:
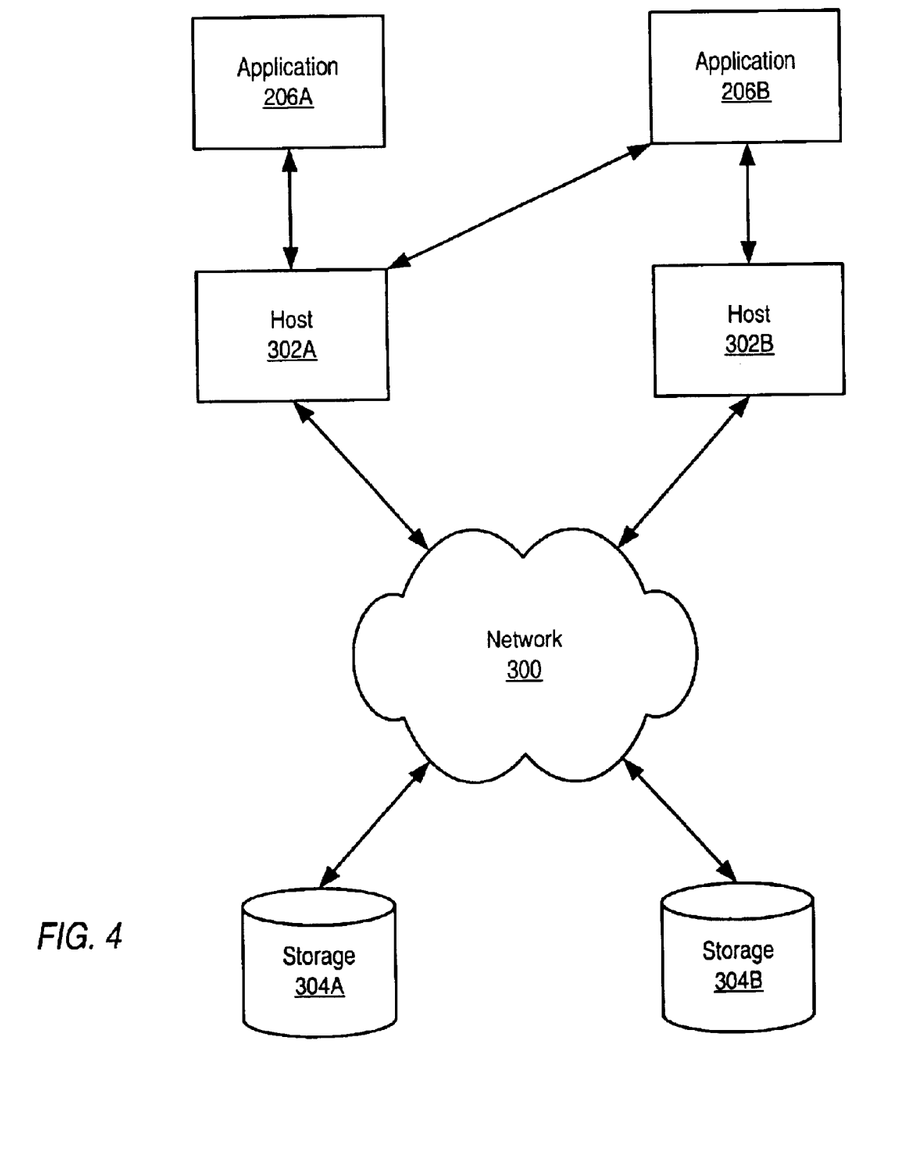
FIG. 4 illustrates a pooled storage environment according to one embodiment.

FIG. 4 illustrates a pooled storage environment according to one embodiment. In this embodiment, one or more hosts 302 (e.g. hosts 302A and 302B) may be coupled to one or more storage units or arrays (e.g. storage 304A and 304B) via a network 300. Network 300 may represent a SAN or a network with Network-Attached Storage (NAS). Hosts 302 (e.g. hosts 302A and 302B) provide access to storage 304A and 304B for two or more applications 306 (e.g. applications 306A and 306B). Note that storage in a SAN or NAS may be pooled (shared by two or more applications 306, e.g. applications 306A and 306B, as in this example) or non-pooled (allocated for use by a single application). Note that one or more of applications 306 (e.g. applications 306A and/or 306B) may reside on the same boxes as hosts 302 (e.g. hosts 302A and 302B) or on other boxes. In this example, applications 306A and 306B share storage 304A and 304B. In one embodiment, a storage analysis mechanism (not shown) may reside on one or more of hosts 302A and 302B, or alternatively on another system which may be coupled to network 300. In this embodiment, the storage analysis mechanism may automatically collect at least some storage information from the pooled storage system, perform inventory analysis on the collected storage information, and generate storage reports and recommendations. In another embodiment, storage analysis mechanism may reside on a system not coupled to network 300. In this embodiment, a user may enter storage information for the pooled storage system into the storage analysis mechanism, which may then perform inventory analysis on the collected storage information, and generate storage reports and recommendations.

Note that embodiments of the storage analysis mechanism may be used in pooled storage systems to monitor storage and make storage recommendations for single applications and/or groups of applications, up to and including all applications in the environment. Pooling storage preferably allows enterprises to reduce total storage capacity and to reduce stockout risk. Embodiments may also be used in pooled storage systems to monitor storage and make storage recommendations for units of the enterprise such as departments and divisions.

Embodiments of the storage analysis mechanism, when applied to pooled (or non-pooled storage) preferably yields lower inventories of unused storage, possibly with lower risk of "stockouts." Embodiments may allow enterprises to explicitly trade off unused storage capacity against availability—or more precisely, to estimate this—for pooled or non-pooled storage. Making such a tradeoff is at the heart of managing service levels.

In one embodiment, pooled storage may be hierarchical; there may be multiple tiers in pooled storage inventory, with potentially different lead times to provision (make storage available) from a general or higher tier or pool (e.g. a corporate pool) to each of two or more specialized or lower tiers or pools (e.g. at the department and/or application level). In some embodiments, storage may be promptly provisioned from pooled storage for use by an application. SRM (Storage Resource Management) tools may help, but policies and procedures preferably enable administrators to quickly provision storage for their applications. Otherwise, administrators may keep their own inventories by requesting the provisioning of storage to their tier too early, potentially negatively impacting the benefits of pooled storage. In addition, storage may be moved from a lower or more specialized tier to a higher or more general tier, e.g. from an application pool to a department pool, if necessary or desired.

Figure 5:
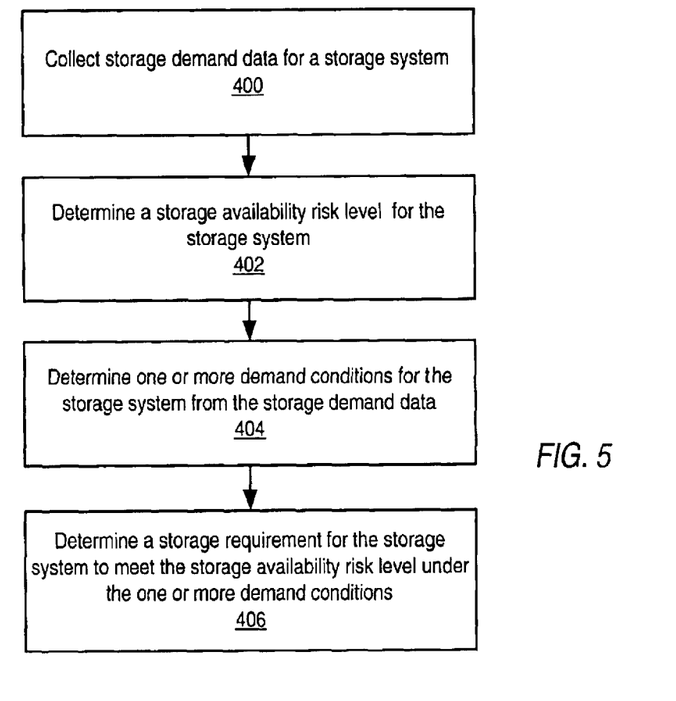
FIG. 5 is a flowchart of a method for determining storage requirements for a storage system according to one embodiment.

FIG. 5 is a flowchart of a method for determining storage requirements for a storage system according to one embodiment. In one embodiment, the storage system may be a pooled storage system (e.g. a SAN system). In one embodiment, the storage system may be a non-pooled storage system (e.g. a DAS system). As indicated at 400, storage demand data for a storage system may be collected. This storage demand data may be automatically collected, user-entered, or a combination of automatically collected and user-entered data. At least some of the storage demand data may be collected over a given time period. As indicated at 402, a storage availability risk level for the storage system may be determined. In one embodiment, a periodic review time may also be determined. The periodic review time indicates the time between periodic reviews of storage consumption. In one embodiment, a lead time to acquire new storage may also be determined.

As indicated at 404, one or more demand conditions for the storage system may be determined from the storage demand data. In one embodiment, the one or more conditions indicated by the storage demand data may include demand, which indicates the amount of storage consumed by one or more applications in a given time period. In one embodiment, the one or more conditions indicated by the storage demand data may include demand variability, a measurement of the amount of variability in storage consumption by the one or more applications in the given time period. In one embodiment, the one or more conditions indicated by the storage demand data may include rate of change of demand in the given time period.

As indicated at 406, a storage requirement for the storage system to meet the storage availability risk level under the one or more conditions indicated by the storage demand data may be determined. In one embodiment, the storage requirement may indicate a target storage inventory-on-hand. In one embodiment, the target storage inventory-on-hand may be used to determine a target storage average inventory-on-hand for a periodic review time.

One embodiment may allow the analysis of the effects on or tradeoffs of modifying one or more storage system factors on other, unmodified storage system factors. In one embodiment, these storage system factors may include, but are not limited to, storage demand capacity, storage availability risk level, and storage requirement. Storage demand capacity may be defined as the amount of demand the storage system can sustain for a given period of time. In one embodiment, the storage management system may be used to determine a storage availability risk level for the storage system given a storage requirement for the storage system under the one or more conditions indicated by the storage demand data. In one embodiment, the storage management system may be used to determine a storage demand capacity given a storage availability risk level and a storage requirement for the storage system.

Figure 6:
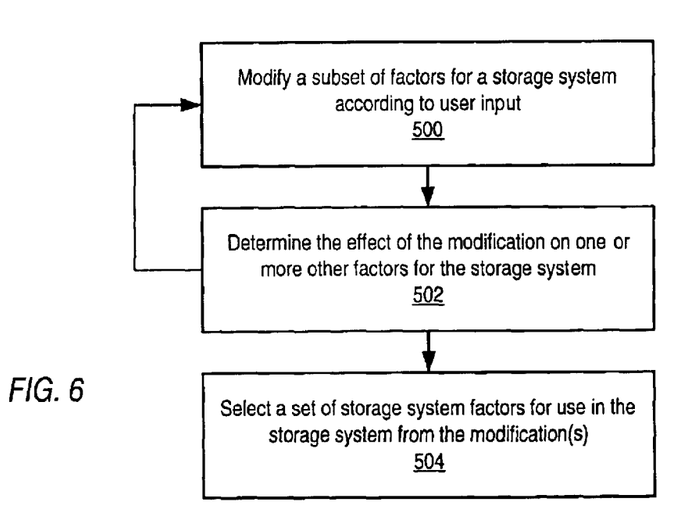
FIG. 6 is a flowchart of a method for determining tradeoffs among storage system factors according to one embodiment.

FIG. 6 is a flowchart of a method for determining tradeoffs among storage system factors according to one embodiment. As indicated at 500, a subset of factors for a storage system may be modified. In one embodiment, these storage system factors may include, but are not limited to, storage demand capacity, storage availability risk level, and storage requirement. In one embodiment, a user interface may be provided to accept user modifications to one or more of the storage system factors. As indicated at 502, the effect of the modification on one or more other storage system factors may be determined. In one embodiment, a user interface may be provided to display feedback of the effects of the modifications on the other storage system factors. As indicated, 500 and 502 may be repeated one or more times by the user to modify one or more of the storage system factors to reach a desired or required level for the storage system factors. As indicated at 504, the user may then select a set of storage system factors for use in the storage system from the one or more iterations of the modification(s), if desired. Note that, in one embodiment, the method may be automated (e.g. as an expert system) to determine an optimal level for the storage system factors given one or more of the storage system factors as input or alternatively given a goal for minimizing or maximizing one or more factors or combinations of factors, e.g. to minimize risk and/or storage inventory requirements.

Figure 7:
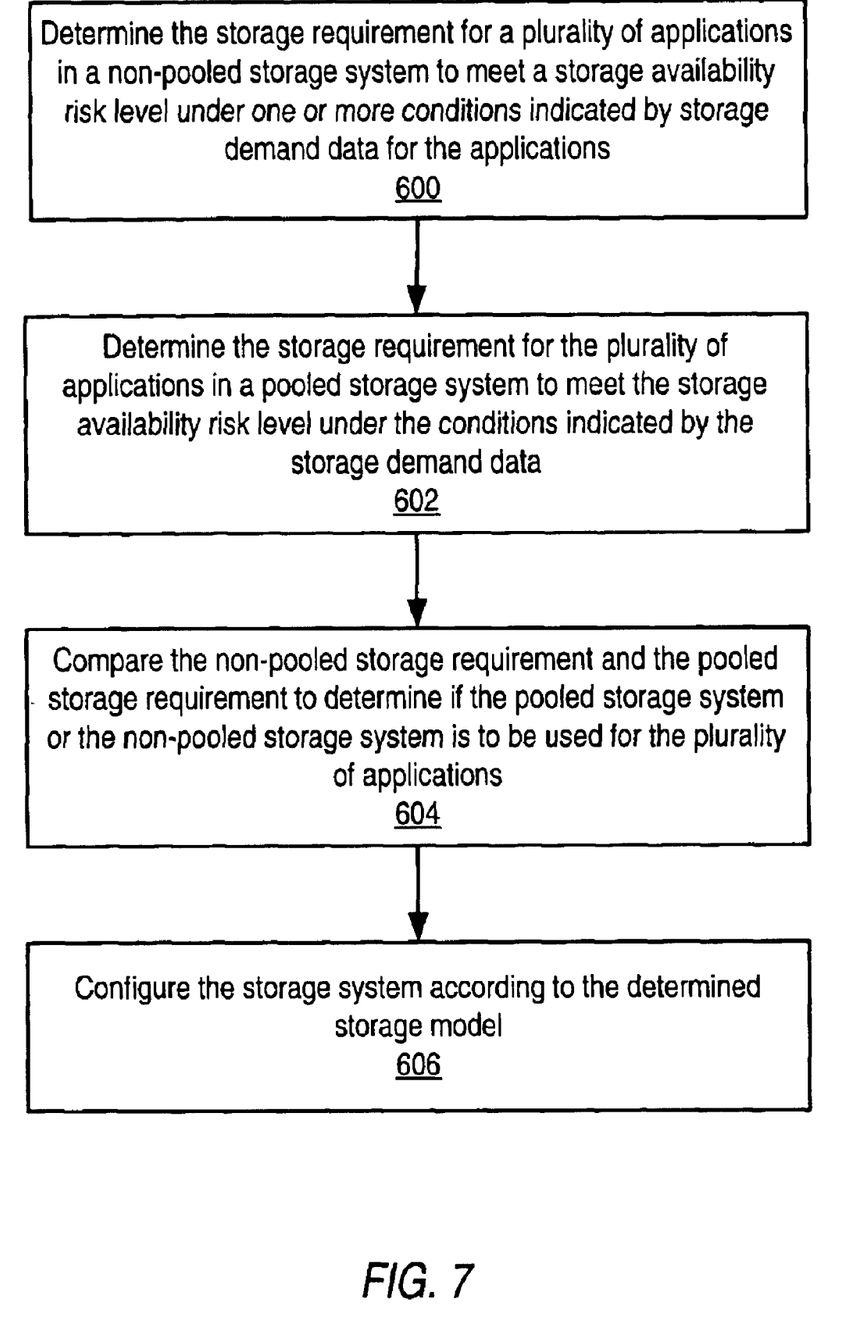
FIG. 7 is a flowchart of a method for comparing pooled storage to non-pooled storage according to one embodiment.

FIG. 7 is a flowchart of a method for comparing pooled storage to non-pooled storage according to one embodiment. As indicated at 600, the storage requirement for a plurality of applications configured in a non-pooled storage system to meet a storage availability risk level under one or more conditions indicated by storage demand data for the applications may be determined. In one embodiment, each of the applications may have an independent storage availability risk level. As indicated at 602, the storage requirement for the plurality of applications configured to use a pooled storage system to meet the storage availability risk level under the conditions indicated by the storage demand data may be determined. Note that, if there are different levels of storage availability risk for two or more of the applications, then a lowest storage availability risk level may be used for the pooled storage system configuration. As indicated at 604, the non-pooled storage requirement and the pooled storage requirement may be compared to determine if the pooled storage system or the non-pooled storage system is to be used for the plurality of applications. Note that, in many situations, pooling storage may preferably result in a lower storage requirement, as the risk for the applications may be spread out over the pooled storage. As indicated at 606, the storage system may then be configured (or re-configured) according to the determined or selected storage model.

Exemplary Inventory Analysis Model

There are many different inventory analysis models (i.e., inventory management techniques) that may be used in embodiments of the storage analysis mechanism. The inventory management techniques described herein are exemplary and not intended to be limiting. In one embodiment, the Periodic Review "order-up-to" Inventory Model may be used. Other embodiments may use other inventory management techniques to estimate storage requirements.

In an inventory model for storage, basestock and average inventory-on-hand may depend on several variables which may include one or more of, but are not limited to: demand (e.g. terabytes/month), standard deviation of demand (demand variability, e.g. terabytes/month), rate of change in demand, periodic review time (e.g. every N months) and lead time (e.g. in months). Note that terabytes and months are used as an example; other units may be used for time (e.g. weeks, days, hours, etc) and storage (e.g. gigabytes, megabytes, bits, etc).

Demand is the amount of storage consumed by an application in a given time period. Standard deviation of demand is a statistic that may be used to estimate variability, in this case demand variability. A high standard deviation implies more variability. Rate of change in demand is a measurement of trends in demand over a time period—i.e. is demand increasing or decreasing? Periodic review time is the time between checks (periodic reviews) to see if an application, a group of applications, or pooled storage (e.g. a SAN) needs more storage. Lead time is the time needed to acquire new storage, and may include one or more of, but is not limited to, the time needed to gain management approval, to secure a purchase order, to ship, to install, and to configure (e.g. to create and/or resize LUNs, volumes and file systems). For databases, lead time may include the time needed to extend database files.

In one embodiment, the inventory analysis process may be continuous or nearly continuous, and there may be a threshold at which the storage analysis mechanism may determine that available storage needs to be added to the storage system. In this embodiment, the storage analysis mechanism may be used to continuously monitor storage consumption and to generate alerts when a threshold is reached indicating that the process of adding available storage needs to be initiated. For example, if storage may be added in increments of n terabytes, then storage analysis mechanism may continuously monitor storage consumption and generate an alert when the process of obtaining n terabytes of storage needs to be initiated.

One embodiment may track one or more of, but not limited to, demand, standard deviation of demand, periodic review time, change in rate of demand, and/or lead time, and may use this information to estimate an application's basestock and average inventory-on-hand for storage. The following are exemplary equations for estimating basestock and average inventory-on-hand for non-pooled storage:

Basestock=(cycle stock)+(safety stock)

Basestock=$(\mu \times (p+l))+(z \times s \times (p+l)^{1/2})$

Average inventory-on-hand=$(\mu \times (p/2))+(z \times s \times (p+l)^{1/2})$ where:

cycle stock: inventory kept on hand to meet expected demand for a period safety stock: inventory kept on hand to handle variation $\mu$: Demand s: Standard deviation of demand p: Periodic review time l: Lead time to acquire new inventory z: Risk tolerance that may vary based on risk tolerance for stockouts Note that the above exemplary inventory model is applicable to non-pooled storage such as DAS systems, systems with single applications, and/or estimating basestock and average inventory-on-hand for storage for single applications in pooled storage environments. The following exemplary inventory model is similar, but has been modified for determining inventory requirements in pooled storage environments (e.g. SAN environments or NAS environments where pooling of storage is used). In pooled storage environments, the following exemplary equations may be used:

$$\text{Basestock} = (p+l)\sum_{i=1}^{n}\mu_i + \left(z \times (p+l)^{\frac{1}{2}}\right)\left(\sum_{i=1}^{n}s_i^2\right)^{\frac{1}{2}}$$

$$\text{Average inventory-on-hand} = (p+l)\sum_{i=1}^{n}\mu_i + \left(z \times (p+l)^{\frac{1}{2}}\right)\left(\sum_{i=1}^{n}s_i^2\right)^{\frac{1}{2}}$$

where:

cycle stock: inventory kept on hand to meet expected demand for a period safety stock: inventory kept on hand to handle variation $\mu$: Demand s: Standard deviation of demand p: Periodic review time l: Lead time to acquire new inventory z: Risk tolerance that may vary based on risk tolerance for stockouts Note that these equations assume that demands of the applications are not correlated. Other inventory models may be used to take into account situations where demand of the applications is partially or fully (positively) correlated or partially or fully negatively correlated.

In one embodiment, one or more of the variables in the equations (demand, standard deviation of demand, periodic review time, lead time, and risk tolerance) may be changed to determine tradeoffs between levels of risk, available storage, and/or demand in storage systems. Decreasing one or more of the variables demand, standard deviation of demand, periodic review time, and lead time will decrease inventory and reduce storage expense, and inversely increasing one or more of these variables will increase inventory and storage expense, at the same risk tolerance level.

The value of z may be chosen by management judgment or benchmarking. To handle situations where stockout risk tolerance is low, z may be set to a higher value; to handle situations where stockout risk tolerance is high, z may be set to a lower value. In one embodiment, risk tolerance may be adjusted up or down to determine the effects on demand and/or available storage.

In one embodiment, a simple constant (e.g. 1, 2, 3 . . . ) may be used for z. In another embodiment, a safety stock factor rather than a constant may be used for z. The safety stock factor may be related to the stockout rate; that is, the proportion of demand that cannot be filled due to lack of inventory. The stockout rate may be found using the following exemplary equation:

$$\text{Stockout rate} = \frac{\left(L(z) \times s \times (p \times l)^{\frac{1}{2}}\right)}{(\mu \times p)}$$

Other stockout rate equations may be use; for example, other equations may be used that address having variable lead times and/or periodic review times. The term fill rate may also be used. Fill rate is the proportion of demand that can be filled:

Fill rate=1−Stockout rate $$\text{Fill rate} = 1 - \frac{\left(L(z) \times s \times (p \times l)^{\frac{1}{2}}\right)}{(\mu \times p)}$$

L(z) is the standard loss function, a statistical function. It may also be referred to as the partial expectation. The following is a an exemplary partial table of values for L(z) and corresponding values for z. Note that standard loss function tables that are more complete may be found in various statistical texts:

| L(z) | z |
|---|---|
| .3989 | 0 |
| .0833 | 1 |
| .0085 | 2 |
| .0004 | 3 |
| .0001 | 3.4 |

In some cases, the owner of the business process that the application serves may be able to change demand and standard deviation of demand. However, in some cases, these variables may not be able to be modified, so storage administrators may have to take these values as given in these cases. Likewise, in some cases, risk tolerance may not be adjustable. That leaves periodic review time and lead time as variables that may be adjusted if desired. If either of these values is reduced, basestock and average inventory-on-hand may be reduced while keeping the same level of risk tolerance, demand, and standard deviation of demand.

Inventory pooling is a tool that may be useful, for example, in reducing inventory requirements. Intuitively, inventory pooling works because not all applications demand storage at the same time, under the assumption that the demand is not perfectly correlated. In one embodiment, an enterprise that has n non-pooled applications consuming (and demanding) storage may use the storage analysis mechanism to determine if a lower basestock and/or a lower average inventory-on-hand may be achieved using pooled storage. Pooling storage for n applications may allow for a lower basestock and/or a lower average inventory-on-hand because the risk for each of the n applications is spread out over the pooled storage.

For a collective inventory of n non-pooled applications, each of which keeps a separate inventory, the inventories may be added together using the following exemplary equations:

$$\text{Basestock} = (p + l) \sum_{i=1}^{n} \mu_i + \left(z \times (p + l)^{\frac{1}{2}}\right) \sum_{i=1}^{n} s_i$$

$$\text{Average inventory-on-hand} = (p + l) \sum_{i=1}^{n} \mu_i + \left(z \times (p + l)^{\frac{1}{2}}\right) \sum_{i=1}^{n} s_i$$

If demand ($\mu_i$) is independent for each application, and the applications' inventories can be pooled (e.g. using a SAN), the exemplary equations for pooled storage described above may be used to determine if a lower basestock and a lower average inventory-on-hand may be achieved using pooled storage by comparing the results of the equations to the equations for non-pooled storage. Note that in other embodiments, other inventory management equations may be used to estimate storage requirements and to compare pooled to non-pooled storage.

Independent demand means that requests for storage are not correlated. As an example, the storage demands of an internal expense report application in one department and the storage demands of a file server in a different department are not likely to be correlated, and thus may represent independent demand.

Note that, if the n applications have different levels of risk tolerance, the lowest level of risk tolerance may have to be used for z in the pooled storage equations, while individual values for z may be used in the equations for the collective inventory of n non-pooled applications. Thus, if there are different levels of risk, pooling storage for at least some of the applications may not be a viable alternative using these equations. Note that, if risk tolerance for the applications cannot be modified, alternatives may be to pool storage for some of the high risk tolerance applications while keeping one or more low risk tolerance applications non-pooled, or to pool high risk tolerance applications in one pool and low risk tolerance applications in another pool.

In one embodiment, if there are different levels of risk, a different inventory model than the exemplary model described above may be used that can determine a combined z when given a set of individual, potentially different values for z for a set of applications, correlation for the demands of the application, and possibly other factors. Alternatively, the enterprise may determine a combined value for z for the set of applications using some method (e.g., simply taking an average for the values of z) and use the combined value for z in the exemplary inventory model described above (or some other inventory model). Thus, even with different values for z for a set of applications, a pooling benefit may still be realized by using a method or model that takes into consideration potentially different values for z.

The above exemplary model assumes a certain level of price stability. Given expectations for areal density increases and per terabyte price declines, this assumption may be constricting. Areal density refers to the amount of data that can be stored on an area of a storage medium (e.g. 1 square inch). Storage media with higher areal densities can store more information in an equal space than those with lower areal densities. Directionally, if prices are falling, postponing purchases as long as possible may be a valid response. This may provide incentive to aim for lower inventories, for example enabled by SAN technology. Thus, in one embodiment, price direction may be an additional factor considered in calculations of basestock and average inventory-on-hand and in determining tradeoffs between levels of risk, available storage, and/or demand in storage systems.

The above exemplary model assumes a constant, though variable, periodic (e.g. monthly) demand. Depending on the industry and the application, this assumption may or may not apply. Thus, in one embodiment, trends (e.g. up or down) in demand (expressed as rate of change in demand) may be an additional factor considered in calculations of basestock and average inventory-on-hand and in determining tradeoffs between levels of risk, available storage, and/or demand in storage systems. Also, note that the amount of storage used from an application perspective may be less than the storage ordered due to redundancy requirements. Thus, in one embodiment, redundancy requirements may be an additional factor considered in calculations of basestock and average inventory-on-hand and in determining tradeoffs between levels of risk, available storage, and/or demand in storage systems.

Conclusion

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory comprising program instructions, wherein the program instructions are executable by the processor to:
   collect storage demand data for a storage system; and
   determine a storage requirement for the storage system to meet a given storage availability risk level under one or more conditions indicated by the storage demand data; wherein the one or more conditions indicated by the storage demand data include:
   demand, wherein the demand indicates an amount of storage consumed by one or more applications in a given time period; and
   demand variability, wherein the demand variability indicates the amount of variability in storage consumption by the one or more applications in the given time period.

2. The system as recited in claim 1, wherein the program instructions are further executable by the processor to determine a storage availability risk level for the storage system given a storage requirement for the storage system under the one or more conditions indicated by the storage demand data.

3. The system as recited in claim 1, wherein the program instructions are further executable by the processor to determine a storage demand capacity given a storage availability risk level and a storage requirement for the storage system.

4. The system as recited in claim 1, wherein the program instructions are further executable by the processor to modify a subset of storage system factors according to user input to determine an effect on one or more other ones of the storage system factors.

5. The system as recited in claim 4, wherein the storage system factors include a storage demand capacity, a storage availability risk level, and the storage requirement.

6. The system as recited in claim 1, wherein the program instructions are further executable by the processor to determine a storage requirement for the storage system to meet a given storage availability risk level under the one or more conditions indicated by the storage demand data given a periodic review time.

7. The system as recited in claim 1, wherein the program instructions are further executable by the processor to determine a storage requirement for the storage system to meet a given storage availability risk level under the one or more conditions indicated by the storage demand data given a lead time to acquire new storage.

8. The system as recited in claim 1, wherein the storage requirement indicates a target storage inventory-on-hand.

9. The system as recited in claim 8, wherein the program instructions are further executable by the processor to determine a target storage average inventory-on-hand from the target storage inventory-on-hand for a given periodic review time.

10. The system as recited in claim 1, wherein the storage system is a pooled storage system for a plurality of applications, wherein the determined storage requirement for the pooled storage system to meet the given storage availability risk level under the one or more conditions indicated by the storage demand data is lower than a combined storage requirement for each of the plurality of applications using non-pooled storage.

11. The system as recited in claim 1, wherein the storage demand data is collected for a plurality of applications, and wherein, to determine a storage requirement for the storage system to meet a given storage availability risk level under one or more conditions indicated by the storage demand data, the program instructions are further executable by the processor to:
   determine a non-pooled storage requirement for the plurality of applications in accordance with a non-pooled storage system to meet the given storage availability risk level under one or more conditions indicated by the storage demand data for the plurality of applications;
   determine a pooled storage requirement for the plurality of applications in accordance with a pooled storage system to meet the given storage availability risk level under one or more conditions indicated by the storage demand data for the plurality of applications; and
   compare the non-pooled storage requirement and the pooled storage requirement to determine if the pooled storage system or the non-pooled storage system is to be used for the plurality of applications.

12. The system as recited in claim 1, wherein the storage system is a Storage Area Network (SAN) system.

13. The system as recited in claim 1, wherein the storage system is a non-pooled storage system for a single application.

14. A method, comprising:

collecting storage demand data for a storage system; and determining a storage requirement for the storage system to meet a given storage availability risk level under one or more conditions indicated by the storage demand data;

wherein said collecting and said determining are performed using a computer system; and wherein the one or more conditions indicated by the storage demand data include:

demand, wherein the demand indicates an amount of storage consumed by one or more applications in a given time period; and demand variability, wherein the demand variability indicates the amount of variability in storage consumption by the one or more applications in the given time period.

15. The method as recited in claim 14, further comprising determining a storage availability risk level for the storage system given a storage requirement for the storage system under the one or more conditions indicated by the storage demand data.

16. The method as recited in claim 14, further comprising determining a storage demand capacity given a storage availability risk level and a storage requirement for the storage system.

17. The method as recited in claim 14, further comprising modifying a subset of storage system factors in response to user input to determine an effect on one or more other ones of the storage system factors, wherein the storage system factors include a storage demand capacity, a storage availability risk level, and the storage requirement.

18. The method as recited in claim 14, further comprising determining a storage requirement for the storage system to meet a given storage availability risk level under one or more conditions indicated by the storage demand data given a periodic review time and a lead time to acquire new storage.

19. The method as recited in claim 14, wherein the storage requirement indicates a target storage inventory-on-hand.

20. The method as recited in claim 14, wherein the storage demand data is collected for a plurality of applications, and wherein, in said determining a storage requirement for the storage system to meet a given storage availability risk level under one or more conditions indicated by the storage demand data, the method further comprises:

determining a non-pooled storage requirement for the plurality of applications in accordance with a non-pooled storage system to meet the given storage availability risk level under one or more conditions indicated by the storage demand data for the plurality of applications;

determining a pooled storage requirement for the plurality of applications in accordance with a pooled storage system to meet the given storage availability risk level under one or more conditions indicated by the storage demand data for the plurality of applications; and comparing the non-pooled storage requirement and the pooled storage requirement to determine if the pooled storage system or the non-pooled storage system is to be used for the plurality of applications.

21. The method as recited in claim 14, wherein the storage system is a Storage Area Network (SAN) system.

22. A computer-accessible medium comprising program instructions, wherein the program instructions are computer-executable to implement:

collecting storage demand data for a storage system; and determining a storage requirement for the storage system to meet a given storage availability risk level under one or more conditions indicated by the storage demand data;

wherein the one or more conditions indicated by the storage demand data include:

demand, wherein the demand indicates an amount of storage consumed by one or more applications in a given time period; and demand variability, wherein the demand variability indicates the amount of variability in storage consumption by the one or more applications in the given time period.

23. The computer-accessible medium as recited in claim 22, wherein the program instructions are further configured to implement determining a storage availability risk level for the storage system given a storage requirement for the storage system under the one or more conditions indicated by the storage demand data.

24. The computer-accessible medium as recited in claim 22, wherein the program instructions are further configured to implement determining a storage demand capacity given a storage availability risk level and a storage requirement for the storage system.

25. The computer-accessible medium as recited in claim 22, wherein the program instructions are further configured to implement modifying a subset of storage system factors in response to user input to determine an effect on one or more other ones of the storage system factors, wherein the storage system factors include a storage demand capacity, a storage availability risk level, and the storage requirement.

26. The computer-accessible medium as recited in claim 22, wherein the program instructions are further configured to implement determining a storage requirement for the storage system to meet a given storage availability risk level under one or more conditions indicated by the storage demand data given a periodic review time and a lead time to acquire new storage.

27. The computer-accessible medium as recited in claim 22, wherein the storage requirement indicates a target storage inventory-on-hand.

28. The computer-accessible medium as recited in claim 22, wherein the storage demand data is collected for a plurality of applications, and wherein, in said determining a storage requirement for the storage system to meet a given storage availability risk level under one or more conditions indicated by the storage demand data, the program instructions are further configured to implement:

determining a non-pooled storage requirement for the plurality of applications in accordance with a non-pooled storage system to meet the given storage availability risk level under one or more conditions indicated by the storage demand data for the plurality of applications;

determining a pooled storage requirement for the plurality of applications in accordance with a pooled storage system to meet the given storage availability risk level under one or more conditions indicated by the storage demand data for the plurality of applications; and comparing the non-pooled storage requirement and the pooled storage requirement to determine if the pooled storage system or the non-pooled storage system is to be used for the plurality of applications.

29. The computer-accessible medium as recited in claim 22, wherein the storage system is a Storage Area Network (SAN) system.

30. A system, comprising:
a processor; and
a memory comprising program instructions, wherein the program instructions are executable by the processor to:
collect storage demand data for a storage system;
determine a storage requirement for the storage system to meet a given storage availability risk level under one or more conditions indicated by the storage demand data; and
modify a subset of storage system factors according to user input to determine an effect on one or more other ones of the storage system factors.

31. The system as recited in claim 30, wherein the storage system factors include a storage demand capacity, a storage availability risk level, and the storage requirement.

32. A system, comprising:
a processor; and
a memory comprising program instructions, wherein the program instructions are executable by the processor to:
collect storage demand data for a storage system;
determine a storage requirement for the storage system to meet a given storage availability risk level under one or more conditions indicated by the storage demand data, wherein the storage requirement indicates a target storage inventory-on-hand; and
determine a target storage average inventory-on-hand from the target storage inventory-on-hand for a given periodic review time.

33. A system, comprising:
a processor; and
a memory comprising program instructions, wherein the program instructions are executable by the processor to:
collect storage demand data for a storage system; and
determine a storage requirement for the storage system to meet a given storage availability risk level under one or more conditions indicated by the storage demand data;
wherein the storage system is a pooled storage system for a plurality of applications, wherein the determined storage requirement for the pooled storage system to meet the given storage availability risk level under the one or more conditions indicated by the storage demand data is lower than a combined storage requirement for each of the plurality of applications using non-pooled storage.

34. A system, comprising:
a processor; and
a memory comprising program instructions, wherein the program instructions are executable by the processor to:
collect storage demand data for a storage system; and
determine a storage requirement for the storage system to meet a given storage availability risk level under one or more conditions indicated by the storage demand data, wherein the storage demand data is collected for a plurality of applications, and wherein, to determine a storage requirement for the storage system to meet a given storage availability risk level under one or more conditions indicated by the storage demand data, the program instructions are further executable by the processor to:
determine a non-pooled storage requirement for the plurality of applications in accordance with a non-pooled storage system to meet the given storage availability risk level under one or more conditions indicated by the storage demand data for the plurality of applications;
determine a pooled storage requirement for the plurality of applications in accordance with a pooled storage system to meet the given storage availability risk level under one or more conditions indicated by the storage demand data for the plurality of applications; and
compare the non-pooled storage requirement and the pooled storage requirement to determine if the pooled storage system or the non-pooled storage system is to be used for the plurality of applications.

35. A method, comprising:
collecting storage demand data for a storage system;
determining a storage requirement for the storage system to meet a given storage availability risk level under one or more conditions indicated by the storage demand data, wherein said collecting and said determining are performed using a computer system; and
modifying a subset of storage system factors in response to user input to determine an effect on one or more other ones of the storage system factors, wherein the storage system factors include a storage demand capacity, a storage availability risk level, and the storage requirement.

36. A method, comprising:
collecting storage demand data for a storage system;
determining a storage requirement for the storage system to meet a given storage availability risk level under one or more conditions indicated by the storage demand data, wherein said collecting and said determining are performed using a computer system; and
wherein the storage demand data is collected for a plurality of applications, and wherein, in said determining a storage requirement for the storage system to meet a given storage availability risk level under one or more conditions indicated by the storage demand data, the method further comprises:
determining a non-pooled storage requirement for the plurality of applications in accordance with a non-pooled storage system to meet the given storage availability risk level under one or more conditions indicated by the storage demand data for the plurality of applications;
determining a pooled storage requirement for the plurality of applications in accordance with a pooled storage system to meet the given storage availability risk level under one or more conditions indicated by the storage demand data for the plurality of applications; and
comparing the non-pooled storage requirement and the pooled storage requirement to determine if the pooled storage system or the non-pooled storage system is to be used for the plurality of applications.

37. A computer-accessible medium comprising program instructions, wherein the program instructions are computer-executable to implement:
collecting storage demand data for a storage system;
determining a storage requirement for the storage system to meet a given storage availability risk level under one or more conditions indicated by the storage demand data; and modifying a subset of storage system factors in response to user input to determine an effect on one or more other ones of the storage system factors, wherein the storage system factors include a storage demand capacity, a storage availability risk level, and the storage requirement.

38. A computer-accessible medium comprising program instructions, wherein the program instructions are computer-executable to implement:

collecting storage demand data for a storage system;

determining a storage requirement for the storage system to meet a given storage availability risk level under one or more conditions indicated by the storage demand data; and wherein the storage demand data is collected for a plurality of applications, and wherein, in said determining a storage requirement for the storage system to meet a given storage availability risk level under one or more conditions indicated by the storage demand data, the program instructions are further configured to implement:

determining a non-pooled storage requirement for the plurality of applications in accordance with a non-pooled storage system to meet the given storage availability risk level under one or more conditions indicated by the storage demand data for the plurality of applications;

determining a pooled storage requirement for the plurality of applications in accordance with a pooled storage system to meet the given storage availability risk level under one or more conditions indicated by the storage demand data for the plurality of applications; and comparing the non-pooled storage requirement and the pooled storage requirement to determine if the pooled storage system or the non-pooled storage system is to be used for the plurality of applications.

* * * * *